United States Patent [19]

Leites et al.

[11] Patent Number: 5,207,147
[45] Date of Patent: May 4, 1993

[54] METHOD FOR THE MANUFACTURE OF A PISTON HEAD HAVING A COOLING CHAMBER AND PISTON HEAD OBTAINED FROM SAID METHOD

[75] Inventors: Jose M. M. Leites; Jose A. C. Mendes; Andre Lippai, all of Sao Paulo, Brazil

[73] Assignee: Metal Leve S/A Industria E Comercio, Sao Paulo, Brazil

[21] Appl. No.: 779,728

[22] Filed: Oct. 17, 1991

[30] Foreign Application Priority Data

Oct. 18, 1990 [BR] Brazil .............................. PI 9005371

[51] Int. Cl.$^5$ ...................... F01B 15/10; B23P 15/10; F02F 7/00
[52] U.S. Cl. ........................................ 92/176; 92/208; 92/222; 92/231; 123/193.6; 29/888.045; 29/888.044
[58] Field of Search ................. 92/176, 222, 208, 231, 92/260; 29/888.04, 888.042, 888.043, 888.044, 888.045; 123/193.6

[56] References Cited

U.S. PATENT DOCUMENTS

| | | |
|---|---|---|
| 1,624,791 | 4/1927 | Kraxberger ............................ 92/176 |
| 2,244,008 | 6/1941 | Hazen et al. ........................... 92/176 |
| 2,840,427 | 6/1958 | Dolza ..................................... 92/176 |
| 3,190,273 | 6/1965 | Bachle et al. .......................... 92/222 |
| 4,532,686 | 8/1985 | Bercher ............................. 29/888.04 |
| 5,065,508 | 11/1991 | Lorento et al. . |

FOREIGN PATENT DOCUMENTS

| | | | |
|---|---|---|---|
| 964281 | 5/1957 | Fed. Rep. of Germany | 92/176 |
| 1251588 | 10/1967 | Fed. Rep. of Germany | 123/193.6 |
| 1262071 | 2/1968 | Fed. Rep. of Germany | 123/193.6 |
| 0252638 | 12/1987 | Fed. Rep. of Germany | 123/193.6 |
| 0118312 | 7/1984 | Japan | 29/888.045 |

Primary Examiner—Thomas E. Denion
Attorney, Agent, or Firm—Darby & Darby

[57] ABSTRACT

A method for the manufacture of a piston head having a cooling chamber is disclosed. The two portions composing the piston head are made separately; the underside of the upper portion is provided with a circumferential peripheral groove; notches are provided on both sides of the open end of the circumferential peripheral groove; a circumferential annular plate is placed on the notches thereby closing the circumferential peripheral groove; the two portions making up the head are joined to each other by welding and cause the inner edge of the annular plate to be retained in the piston head and become an integral part thereof.

10 Claims, 1 Drawing Sheet

METHOD FOR THE MANUFACTURE OF A PISTON HEAD HAVING A COOLING CHAMBER AND PISTON HEAD OBTAINED FROM SAID METHOD

BACKGROUND OF THE INVENTION

The present invention relates to a method for manufacturing a piston head, particularly an articulated, or two-piece, piston head provided with a closed cooling chamber on its top portion.

Closed cooling chambers of pistons of the prior art, including articulated pistons, have been manufactured by the gravity casting method only. However, this method has proven to be inadequate for making articulated piston heads since some lack the structural strength required to withstand the high thermal and mechanical loads imposed to the piston head top portion.

Therefore, in the known articulated pistons the cooling chamber is of the semi-open type, which is defined by a groove on the underside of the top and a tray provided on the skirt upper portion. In such cooling chambers, the cooling medium is supplied to the chamber by a nozzle located at the engine crankcase, and circulates in the chamber. Due to the reciprocating motion of the piston the cooling medium splashes against the combustion bowl lower wall and the ring zone inner wall, thereby removing part of the heat generated in said regions.

However, for certain applications it is desirable to maintain the cooling medium for a longer period of time inside the cooling chamber. This not only increases the efficiency of the cooling process but also makes possible using substantially smaller quantities of cooling medium (engine lubricating oil), thus requiring an oil pump with a smaller output.

OBJECT OF THE INVENTION

Therefore, it is the object of the present invention to provide a method to manufacture a piston head, particularly an articulated piston head, having a closed cooling chamber, as well as the piston head thus obtained.

BRIEF DESCRIPTION OF THE INVENTION

The present invention provides a piston head having a cooling chamber of the closed type, and a method of manufacture in which a first blank having a substantially cylindrical section is provided. The first blank is machined with a peripheral circumferential groove and a central recess so as to define a circumferential rib. Two notches are also formed on said first blank, one on each side of the open end of said peripheral circumferential groove. A second blank having a substantially cylindrical, square or rectangular section is also provided which is machined to have a central recess and a peripheral outer recess so as to define a circumferential rib. A circumferential annular plate is placed on the notches on the open end of said peripheral circumferential groove and the circumferential rib of the first and second blanks are juxtaposed and joined to define the rough piston head. The first and second blanks are formed together, preferably by welding.

BRIEF DESCRIPTION OF THE DRAWINGS

The invention will be hereinafter described with reference to the accompanying drawings where.

DETAILED DESCRIPTION OF THE INVENTION

Figure 1:
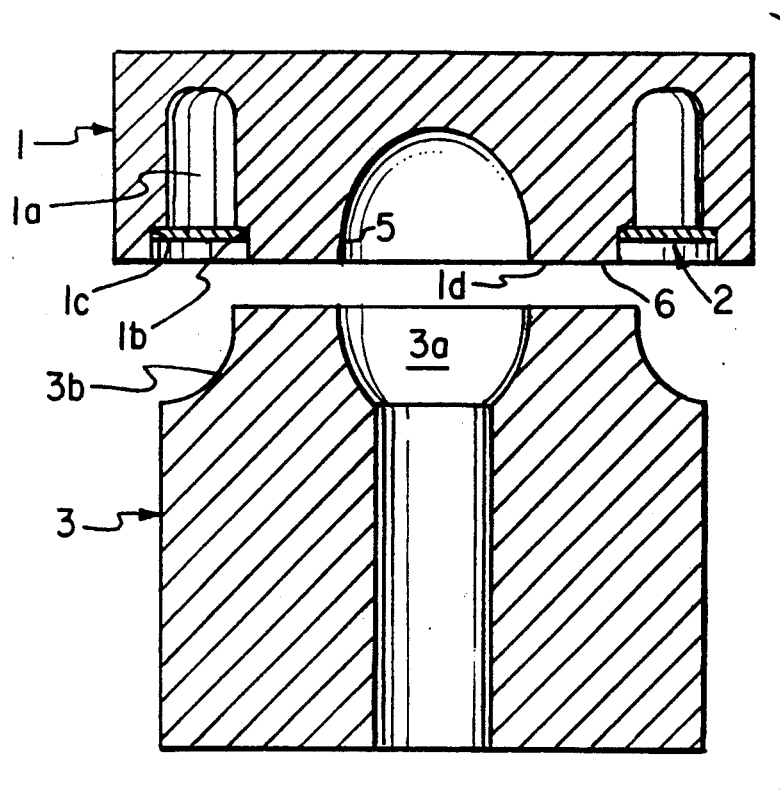
FIG. 1 is a longitudinal section view of the two portions forming the piston head of the present invention.
Figure 2:
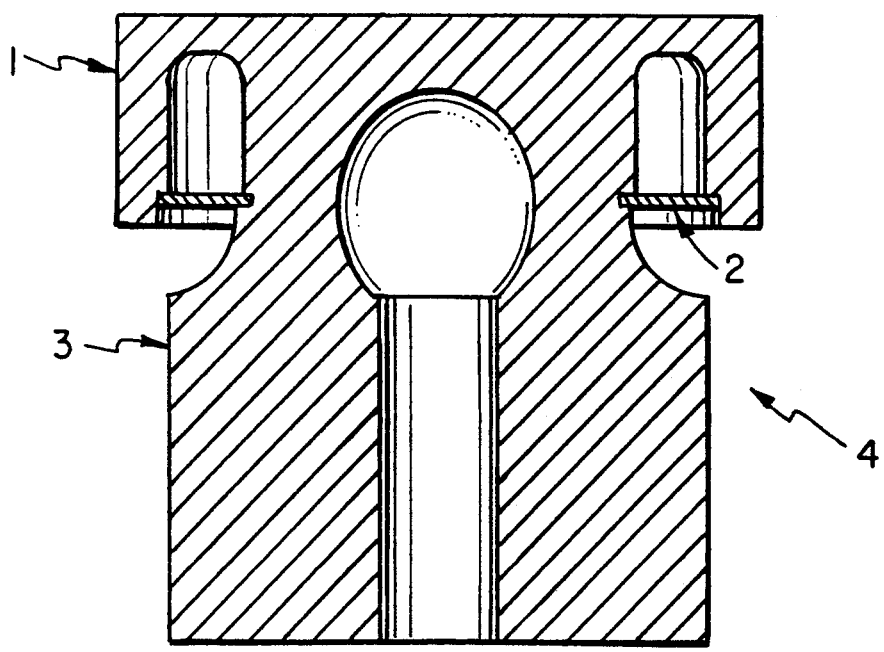
FIG. 2 is a longitudinal section view of the piston head made in accordance with the method of the invention.

According to one preferred embodiment, the articulated piston head having a closed cooling chamber is obtained by the following method:

(a) a first blank 1 is formed from a first billet, preferably of steel of a composition suitable for use. The first blank preferably has a substantially cylindrical section;

(b) the first blank 1 is subjected to machining operations to provide a circumferential peripheral groove 1a and a central recess 5 in order to define a circumferential tab 6;

(c) the first blank 1 is provided with two notches 1b and 1c, one on each side of the open end of the circumferential peripheral groove 1a;

(d) a second blank 3 is formed from a billet preferably of steel of a composition suitable for use having a substantially cylindrical, or square or rectangular section;

(e) the second blank 3 is subjected to machining operations for the provision of a central recess 3a and a peripheral external recess 3b which defines a rib 3c;

(f) a circumferential annular plate 2 is placed so as to rest on notches 1b and 1c of the circumferential peripheral groove 1a of the first blank 1 (see FIG. 2);

(g) the first blank 1 and the second blank 3 are united to each other by welding the circumferential rib 1d of first blank 1 to the circumferential rib 3c of blank 3, thereby forming the rough piston head 4.

The welding operation effects the securing of the inner edge of the annular plate 2 which becomes integral with the piston head (FIG. 2), while the outer edge of the annular plate 2 rests on notch 1c.

In subsequent operations, the rough head 4 is subjected to final machining for the provision of the ring grooves and the pin bosses. These operations are neither described nor illustrated for they are not a material aspect of the present invention.

The preferred method for carrying out the present invention is the friction welding process, however, other welding processes known in the art can be employed as well.

While disclosing and illustrating a preferred embodiment, it should be appreciated that other embodiments may be within the scope of the invention. Thus, for instance, the two portions of the piston head obtained from a steel billet as claimed herein may be obtained by forging or even sintering, without departing from the spirit of the invention.

What is claimed is:

1. Method for manufacture of a piston head having a cooling chamber of the closed type, comprising the steps of:

providing a first blank having a substantially cylindrical section;

forming on said first blank a peripheral circumferential groove surrounded by an outer wall and forming a central recess and a first circumferential rib therearound which is the inner wall of said groove;

providing a second blank;

forming on said second blank a central recess and a peripheral outer recess with a second circumferential rib therebetween;

placing a circumferential annular plate over the open end of said peripheral circumferential groove of said first blank; and juxtaposing said first and second circumferential ribs and joining them to join said first blank to said second blank to form the rough piston head with said circumferential annular plate and outer wall of said first blank overhanging said peripheral outer recess of said second blank.

2. The method of claim 1, wherein said first and second blanks are obtained from steel billets.

3. The method of claim 1, wherein the joining of said first blank and second blanks is accomplished by welding.

4. The method of claim 3 where the welding is friction welding.

5. The method of claim 1 wherein the step of joining includes the inner edge of said circumferential annular plate to and first and second circumferential ribs.

6. The method of claim 1 further comprising the steps of forming two notches, one on each side of the outer wall and the rib which defines the open end of said peripheral circumferential groove of said first blank; and the step of placing comprises placing the inner edge of the peripheral annular plate in one of said notches and forming a connection therewith with said first and second ribs.

7. The method of claim 6 wherein the step of joining leaves the outer edge of said circumferential annular plates resting on the notch of said outer wall.

8. The method of claim 2 wherein said blanks are machined to form said grooves, recesses and ribs.

9. A piston head comprising:

a first circumferential blank having a cooling chamber defined by a peripheral circumferential groove, a central recess and a first rib between said groove and recess, a second blank with an outer peripheral recess and a central peripheral recess defining a second rib therebetween, said first and second ribs being juxtaposed and said first and second blanks joined together at said ribs, and a circumferential annular plate closing off the first blank circumferential peripheral groove and overhanging the second blank outer peripheral recess.

10. The piston head of claim 9, wherein the inner edge of said circumferential annular plate is integral with said piston head and the outer edge of said circumferential annular plate rests on a notch provided on the outer wall of the open end of the cooling chamber of said first blank.

* * * * *